Dec. 20, 1955  C. C. SMITH  2,727,608
VARIABLE SPEED TRANSMISSION
Filed May 25, 1955
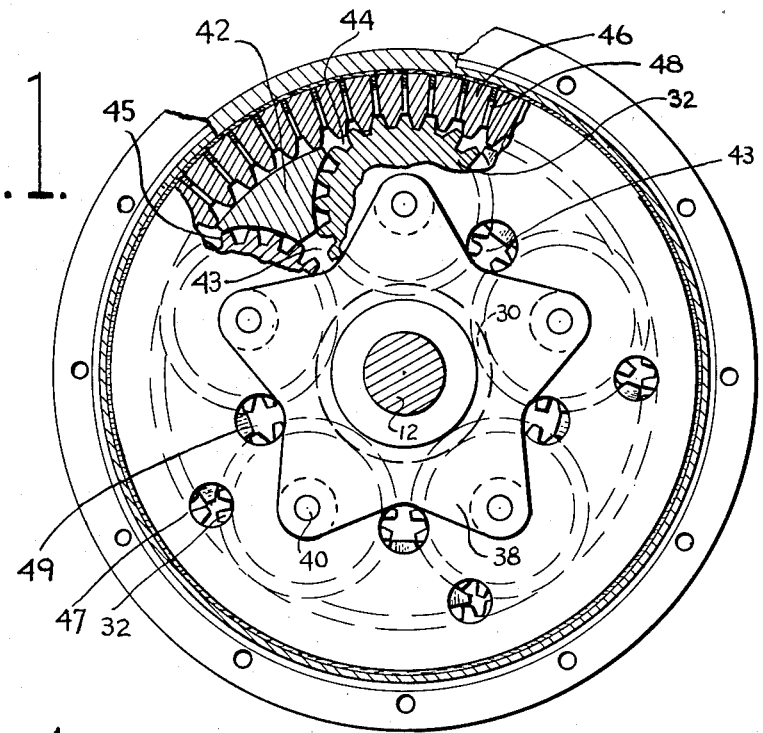
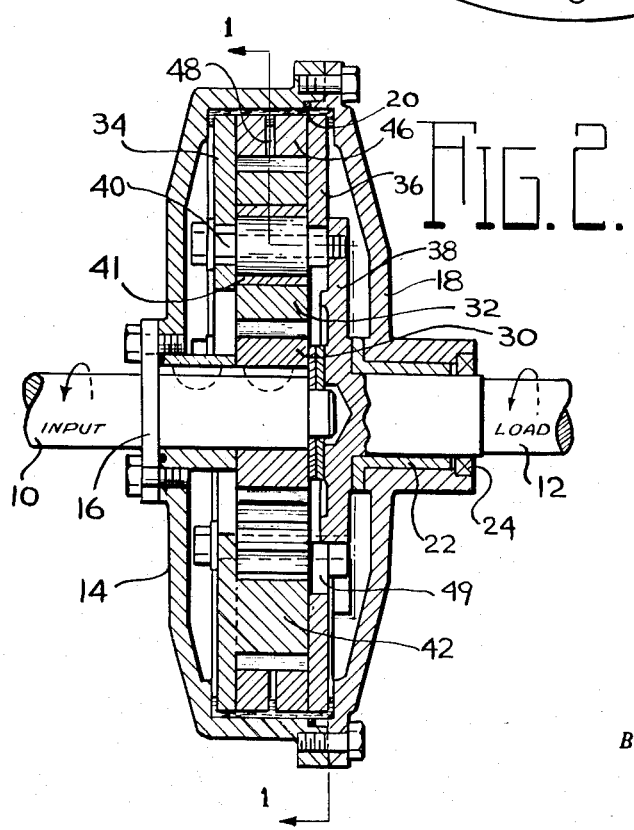
INVENTOR.
Charles C. Smith
BY
ATTORNEYS

United States Patent Office 2,727,608
Patented Dec. 20, 1955

2,727,608

VARIABLE SPEED TRANSMISSION

Charles C. Smith, Adrian, Mich.

Application May 25, 1955, Serial No. 510,902

2 Claims. (Cl. 192—61)

This invention relates to the transmission of power and is particularly directed to a transmission in which a force developed by a revolving body of liquid is utilized to cause coupling between a driving gear and a load connected driven member.

A primary object of the present invention is to provide a transmission in which coupling between the driving and driven parts is established smoothly and without shock and which, when coupled, transmits power efficiently and with a minimum of energy loss.

Briefly, the present invention comprises a housed planetary gearing in which the driven sun gear is meshed with planet gears connected to the load, and meshed with a ring gear. The ring gear acts with the planet gears to form a plurality of liquid pumps the discharge of which is through openings in the ring gear against a fluid pressure set up by a rotating body of liquid, preferably a liquid of high specific gravity. The heavy liquid is held against the housing by centrifugal force.

The advantages of the invention will become apparent from the following detailed description of a preferred embodiment, reference being had to the accompanying drawings, in which—

Figure 1 is an elevational view of the driven or load side of the transmission with a cover removed and with parts broken away along section line 1—1 in Fig. 2; and Fig. 2 is a central vertical sectional view of a transmission embodying the present invention.

Referring to the drawings, the driving shaft is designated 10 and may be connected to any suitable prime mover. The driven shaft is designated 12 and may be connected to any suitable load.

Keyed or splined to the driving shaft 10 is a housing 14 having a tight, sealed end cover plate 16. The housing 14 is open at its rear side to receive the transmission elements and, after assembly, is closed by a rear cover 18 which is bolted to the periphery of the main portion of the housing. The joint between the housing 14 and its rear cover 18 must be sealed against leakage and for this purpose any suitable gasket 20 may be interposed between facing portions of these elements. The cover 18 is journalled over the load or output shaft 12 by bushing 22 and an oil seal 24 is provided to seal against leakage axially of the shaft 12.

A sun gear 30 is keyed or splined to the input shaft 10 and meshes with a plurality of planet gears 32 carried by front and rear plates 34 and 36, the rear plate being fixed to the output shaft 12 by an arm or spider 38. The planet gears 32 are journalled on shafts 40, in bearings 41 mounted over the shafts and the front and rear plates 34 and 36 are held a predetermined distance from each other so that the planet gears are free to turn, but move with their side faces in close proximity to the front and rear plates 34 and 36.

Interposed in the space between the planet gears and extending from the front plate 34 are bosses 42 which are in close relationship to the path taken by the teeth of the ring gear hereinafter described and are arcuately formed to the contour of the planet gears. The bosses 42 thus separate what may be termed a fluid pump inlet opening 43 and a discharge space 44, the latter being near the point of intersection of the planet and ring gears. The bosses extend axially between the front and rear cover plates and may be integral with either.

A ring gear 46 meshes with all of the planet gears 32 and is radially supported thereby and axially located by the front and rear plates 34 and 36 with respect to which it is free to turn. The ring gear is disposed in close predetermined relationship to the interior of the housing 14 so that the clearance between the outer surface of the ring gear and the inner surface of the housing is a known, controlled factor.

At the root diameter of the ring gear 46, between each adjoining tooth thereof, is a small hole 48 which thus opens into the clearance space around the ring gear and forms a discharge opening for liquid pumped or carried into the discharge spaces 45 as hereinafter described.

After assembly of the parts above described the transmission housing is charged with a predetermined volume of a heavy (high specific gravity) liquid such as mercury, and a second predetermined volume of a liquid of lower specific gravity such as lubricating oil. The liquids are preferably immiscible. A single liquid may be used if desired, but the physical size of a unit of given torque capacity may be reduced by the addition of a heavy liquid.

When power is applied to rotate the input shaft 10 and assuming that the direction of rotation is counterclockwise when viewed from the load end of the transmission, the sun gear 30, being keyed to the shaft, rotates at the same speed and in a counterclockwise direction. This drives the planet gears in a clockwise direction, initially at the same speed as the sun gear, and the ring gear 46 is thus driven in a clockwise direction at a lower speed, depending on the ratio of its teeth to the number of teeth on the planet gears 32. The housing 14, being fixed to the input shaft, rotates therewith, thus rotating the body of heavy liquid, causing it to move to the periphery of the housing by centrifugal force. The heavy liquid thus occupies the clearance space between the ring gear and the interior of the housing at a pressure which depends on the speed of rotation of the housing.

The lighter liquid with which the housing has been charged enters and occupies the inlet chambers 43 between the planet gears and is picked up in the space between the teeth of the planet gears and the adjacent surfaces of the bosses 42. The planet gears thus act as gear pumps attempting to force the lighter liquid into the discharge spaces 44 and out through the openings 48 into the space occupied by the heavy liquid. Inlet openings 49 in either the front or rear plates 34 and 36 or both act to supply fluid to the planet gear pump inlet chambers 43.

Openings 47 in the front and rear plates form inlet openings to supply oil to the ring gear which thus acts as a gear pump to transport liquid from the openings 47 into the discharge spaces 44. As in the case of the pumps formed by the planet gears, liquid so transported can flow out of the discharge chamber only through openings 48 against the pressure of the liquid behind the ring gear.

As the lighter liquid becomes trapped in the discharge spaces 44 it is unable to move out through the openings 48 in a volume as large as the volume brought into the spaces by the ring gear and planet gear pumps. Such resistance to flow causes the planet gears and the ring gear to slow down and eventually to become substantially locked with respect to each other and the planet gears to become locked with respect to the sun gears so that the entire assembly moves in a counterclockwise direction carrying the plates 34 and 36 and the connecting spider or arm 38 in the same direction. The load shaft 12, being a part or extension of arm 38 begins to move in the same direction and eventually at essentially the same rate as the input shaft 10.

It is apparent that the torque capacity of the transmission can be increased either by making the radius of the housing larger or by increasing its speed of rotation since these are the two factors that determine the centrifugal force acting on the body of heavy liquid, which, in turn, establishes the resistance to flow of the lighter fluid out through the ring gear.

It will be seen that with the parts at rest the transmission is completely free from the driving to the driven end, and that coupling is established only as the housing and driving gear throw the liquids into the ultimate position occupied when the transmission is fully coupled. The load is thus picked up smoothly, and without shock, and the torque transmitted almost without loss. The only losses that occur are due to fluid flow around the side plates 34 and 36, against the pressure of centrifugal force. The heat developed is, therefore, very small and easily dissipated.

When the drive shaft 10 first turns, the gear ratio between the driving and driven shafts depends on the relative diameters of the sun gear and the ring gear and the length of the arm in which the planet gears are mounted and may be, for example, 4 to 1. However, when the load has been picked up and power is flowing normally to the driven shaft 12, that shaft rotates 1 to 1 with the drive shaft. Whatever forces are acting tending to lock the ring gear to the planet gears are multiplied by the 4 to 1 ratio, and the speed of the driven shaft times the torque requirements of the load is always balanced against the speed of the drive shaft times the applied torque.

While the invention has been disclosed in conjunction with a specific form and disposition of the parts, it should be expressly understood that numerous modifications and changes may be made without departing from the scope of the appended claims.

What I claim is:

1. A transmission comprising a drive shaft, a housing connected to rotate with said drive shaft, a sun gear connected to rotate with said drive shaft, a plurality of planet gears meshing with said sun gear, an arm carrying all of said planet gears, a driven shaft, a connection between said arm and said driven shaft, a ring gear meshing with said planet gears, said ring gear having a plurality of openings therethrough, means cooperating with said planet and ring gears to form inlet and discharge chambers inside said ring gear, a body of heavy liquid in said housing moved by centrifugal force to stand between said ring gear and said housing, and a body of liquid in said chambers tending to be carried from said inlet to said discharge chambers and out of said discharge chamber against said heavy liquid and thereby tending to lock said ring gear to said planet gears and said planet gears to said sun gear.

2. A transmission comprising a drive shaft, a housing connected to rotate with said drive shaft, a sun gear connected to rotate with said drive shaft, a plurality of planet gears meshing with said sun gear, an arm carrying all of said planet gears, a driven shaft, a connection between said arm and said driven shaft, a ring gear meshing with said planet gears, said ring gear having a plurality of openings therethrough, means cooperating with said planet and ring gears to form inlet and discharge chambers inside said ring gear, a body of liquid in said housing moved by centrifugal force to stand in said chambers and between said ring gear and housing, said liquid being urged from said inlet chambers to said discharge chambers by said planet gears and said ring gear acting as pumps and being retained in said discharge chambers by the pressure of liquid developed by centrifugal force, whereby said ring gear and said planet gears tend to become locked and to revolve about said sun gear.

References Cited in the file of this patent

UNITED STATES PATENTS

| 1,363,907 | Olson | Dec. 28, 1920 |
| 2,242,112 | Chester | May 13, 1941 |
| 2,371,227 | Dodge | Mar. 13, 1941 |